(12) United States Patent
Sauven et al.

(10) Patent No.: US 12,509,245 B2
(45) Date of Patent: Dec. 30, 2025

(54) TOW-BAR FITTING

(71) Applicants: Airbus Operations Limited, Bristol (GB); Airbus Operations (S.A.S.), Toulouse (FR)

(72) Inventors: James Sauven, Bristol (GB); Laurent Tizac, Toulouse (FR)

(73) Assignees: Airbus Operations Limited, Bristol (GB); Airbus Operations (S.A.S.), Toulouse (FR)

( * ) Notice: Subject to any disclaimer, the term of this patent is extended or adjusted under 35 U.S.C. 154(b) by 309 days.

(21) Appl. No.: 18/318,235

(22) Filed: May 16, 2023

(65) Prior Publication Data

US 2023/0373627 A1 Nov. 23, 2023

(30) Foreign Application Priority Data

May 17, 2022 (GB) ..................... 2207189

(51) Int. Cl.
*B64F 1/223* (2024.01)
*B64C 25/00* (2006.01)
*B64D 3/00* (2006.01)

(52) U.S. Cl.
CPC ............ *B64F 1/224* (2013.01); *B64C 25/001* (2013.01); *B64D 3/00* (2013.01); *F16B 2200/63* (2023.08)

(58) Field of Classification Search
CPC .......... B60D 1/04; B60D 1/243; B60D 1/244; B64C 25/00; B64C 25/001; B64D 3/00; B64D 3/02; B64F 1/223; B64F 1/224; F16B 2200/63; F16C 11/04; F16C 11/045;

(Continued)

(56) References Cited

U.S. PATENT DOCUMENTS 4,078,866 A * 3/1978 Hawkins ............... A01B 35/225
403/79
5,542,774 A * 8/1996 Hoy ....................... A61F 5/0125
403/116

(Continued)

FOREIGN PATENT DOCUMENTS

DE 3642044 A1 * 6/1988 .............. B64F 1/224
EP 2489592 A1 8/2012
FR 3 079 821 A1 10/2019

OTHER PUBLICATIONS

Extended European Search Report for Application No. 23168807.8, eight pages, dated Sep. 20, 2023.

(Continued)

*Primary Examiner* — Josh Skroupa
(74) *Attorney, Agent, or Firm* — Nixon & Vanderhye P.C.

(57) ABSTRACT

A tow-bar fitting for connecting a tow-bar to an aircraft landing gear is disclosed including a tow-bar attachment to which, in use, the tow-bar is coupled. The tow-bar fitting also includes a first fuse member via which linear loads but not torque loads are transmitted from the tow-bar attachment to the rest of the landing gear. The first fuse member is configured to fail at a predetermined linear load threshold. The tow-bar fitting includes a second fuse member via which torque loads are transmitted from the tow-bar attachment to the rest of the landing gear. The second fuse member is configured to fail at a predetermined torque load threshold. A method of towing an aircraft is also disclosed.

16 Claims, 4 Drawing Sheets

(58) Field of Classification Search
CPC .......... Y10T 403/11; Y10T 403/32221; Y10T 403/32557; Y10T 403/32581
USPC .............. 403/2, 79, 113, 116; 280/493, 494
See application file for complete search history.

(56) References Cited

U.S. PATENT DOCUMENTS

| | | | |
|---|---|---|---|
| 6,779,808 B2 * | 8/2004 | Connor | B60D 1/143 280/494 |
| 7,954,777 B2 * | 6/2011 | Bohm | H01Q 1/1221 403/116 |
| 8,567,807 B2 * | 10/2013 | Su | B60D 1/54 280/494 |
| 8,939,461 B1 | 1/2015 | Kalmanson | |
| 11,530,051 B2 * | 12/2022 | Daneshvaran | B64C 25/001 |
| 2009/0101754 A1 | 4/2009 | O'Connell | |
| 2021/0380276 A1 | 12/2021 | Daneshvaran et al. | |
| 2022/0170499 A1 | 6/2022 | Wilson | |

OTHER PUBLICATIONS

Combined Search and Examination Report for Application No. GB2207189.8, dated Nov. 18, 2022, 6 pages.

* cited by examiner

TOW-BAR FITTING

CROSS RELATED APPLICATION

This application claims priority to United Kingdom Patent Application GB 2207189.8, filed May 17, 2022, the entire contents of which is hereby incorporated by reference.

BACKGROUND OF THE INVENTION

The present disclosure relates to aircraft landing gear. More particularly, but not exclusively, this invention concerns an aircraft landing gear assembly comprising a tow-bar fitting, a tow-bar fitting for use in such a landing gear and a method of towing an aircraft having such a landing gear.

Tow-bar fittings are used on the nose landing gear of aircraft to allow the aircraft to be towed by tractors. A tow-bar is connected at one end to the tractor and at the other end to the tow-bar fitting on the landing gear. During towing, the landing gear experiences linear and torque forces. Linear forces may be defined as forces that act to push or pull the landing gear, for example in a substantially horizontal plane. Torque forces may be defined as forces that act to rotate the landing gear, for example in a substantially horizontal plane.

Existing tow-bar fittings typically comprise a simple arrangement with a horizontal bar that is bolted at either side to the rest of the landing gear. In use, the tow-bar is coupled to the horizontal bar in order to tow the aircraft. In some tow-bar fittings the horizontal bar is fixed to the rest of the landing gear using a fuse bolt at either end, the fuse bolts being designed to fail at a predetermined load threshold. The predetermined load threshold corresponds (within a given safety margin) to the lowest magnitude load that could damage the landing gear. However, such fuse bolts have been found to fail very frequently and often under loads that would not have resulted in damage to the landing gear (hereafter a false failure).

It would be advantageous to provide a tow-bar fitting that protects the landing gear from damage when towing but which reduces the number of false failures.

Additionally or alternatively, it would be advantageous to provide a tow-bar fitting that protects a landing gear from damage cause by excess towing loads in a mechanically simple manner and/or without significantly increasing the cost and/or weight of the landing gear.

Alternatively or additionally, the present invention seeks to provide an improved tow-bar fitting.

SUMMARY OF THE INVENTION

The present invention provides, according to a first aspect, an aircraft landing gear assembly comprising a main leg and a tow-bar fitting, for example mounted on the main leg, for connecting a tow-bar to the landing gear assembly. The tow-bar fitting may comprise: a tow-bar attachment to which, in use, the tow-bar is coupled; a first fuse member via which linear loads but not torque loads are transmitted from the tow-bar attachment to the rest of the landing gear, for example the main leg, the first fuse member being configured to fail at a predetermined linear load threshold; and/or a second fuse member via which torque loads are transmitted from the tow-bar attachment to the rest of the landing gear, for example the main leg, the second fuse member being configured to fail at a predetermined torque load threshold. It may be that the predetermined linear load threshold differs from the predetermined torque load threshold.

Thus, tow-bar fittings in accordance with the present invention include a first fuse member to protect against excess linear loads and a second fuse member to protect against excess torque loads. This may allow the number of false failures to be reduced by reflecting the different limitations for those two different types of loading. Additionally or alternatively, the claimed arrangement may provide improved protection of the landing gear assembly without adding significant mechanical complexity, cost or weight.

It may be that the tow-bar fitting is arranged such that linear loads are transmitted from the tow-bar attachment to the rest of the landing gear assembly, for example to the main leg, via the first fuse member. It may be that the tow-bar fitting is arranged such that torque loads are not transmitted from the tow-bar attachment to the rest of the landing gear assembly, for example to the main leg, via the first fuse member. It may be that the tow-bar fitting is arranged such that torque loads are transmitted from the tow-bar attachment to the rest of the landing gear assembly, for example to the main leg, via the second fuse member. It may be that the tow-bar fitting is arranged such that linear loads are not transmitted from the tow-bar attachment to the rest of the landing gear assembly, for example to the main leg, via the second fuse member.

The use of mechanical fuses is well known in aircraft. Each fuse member is designed to fail at a certain load (a predetermined load threshold). Each fuse member is arranged and constructed as a point of weakness along a load path. For example, such that the fuse member will fail at a lower load than any other component along the load path. Thus, the properties, for example the dimensions and/or material of the fuse member may differ from those of other components along the load path such that the fuse member fails at a lower load than said other components. The dimensions and/or material of the fuse member may be selected to ensure the fuse member will fail at the predetermined load threshold. The fuse member may be a fuse pin or fuse bolt. The fuse member may be configured to fail in shear.

The predetermined linear load threshold may be higher, for example 20% higher, for example 50% higher, than the predetermined torque load threshold. The predetermined linear load threshold may be less than or equal to the maximum linear load to which the landing gear assembly can be subjected without sustaining damage. The predetermined torque load threshold may be less than or equal to the maximum torque load to which the landing gear assembly can subjected without sustaining damage. It will be appreciated that the predetermined load thresholds will typically include a safety margin.

The tow-bar fitting may comprise a first load path between the rest of the landing gear assembly and the tow-bar attachment, for example between the main leg and the tow-bar attachment. The first fuse member may be located on the first load path. The tow-bar fitting may be configured such that linear loads are transferred along the first load path between the tow-bar attachment and the rest of the landing gear assembly. The tow-bar fitting may be configured such that torque loads are not transferred along the first load path between the tow-bar attachment and the rest of the landing gear assembly.

The tow-bar fitting may comprise a second load path between the rest of the landing gear assembly and the tow-bar attachment, for example between the main leg and the tow-bar attachment. The second fuse member may be located on the second load path. The tow-bar fitting may be configured such that torque loads are transferred along the second load path between the tow-bar attachment and the rest of the landing gear assembly. The tow-bar fitting may be configured such that linear loads are not transferred along the second load path between the tow-bar attachment and the rest of the landing gear assembly.

It may be that the tow-bar attachment is mounted to the rest of the landing gear assembly, for example on the main leg, via the first fuse member for rotation relative to the rest of the landing gear assembly (and/or the main leg), for example over a limited range of rotational movement. It may be that the tow-bar attachment is arranged to rotate relative to the first fuse member, for example to pivot about the first fuse member, for example over a limited range of rotational movement. The tow-bar attachment may be mounted for rotation in a substantially horizontal plane when the landing gear is in use. It may be that the second fuse member is arranged to limit rotation of the tow-bar attachment relative to the rest of the landing gear assembly and/or the main leg. Mounting the tow-bar attachment for rotation via the first fuse member and limiting that rotation using the second fuse member may be a reliable, mechanically simple and/or weight-efficient way of providing a first fuse member that can transfer linear but not torque loads and a second fuse member that can transfer torque loads.

The tow-bar fitting may comprise a slot. It may be that the second fuse member is received in the slot such that the second fuse member moves along the slot when the tow-bar attachment rotates relative to the rest of the landing gear assembly/main leg. It may be that the range of movement of the second fuse member along the slot determines the range of rotational movement of the tow-bar attachment. Using such a slot may be a reliable, mechanically simple and/or weight-efficient way of providing a limited rotational movement of the tow-bar attachment using the second fuse member.

It may be that the tow-bar fitting comprises two second fuse members and two slots, and each second fuse member is received in a slot such that the second fuse member moves along the slot when the tow-bar attachment rotates relative to the main leg and the range of movement of the second fuse member along its slot determines the range of rotational movement of the tow-bar attachment relative to the rest of the landing gear assembly and/or the main leg. Using a pair of slots may provide a more balanced load distribution across the tow-bar fitting when subject to torque loads, such a reduction in peak stress within the fitting allowing for smaller and/or lighter components to be used and/or increasing the lifetime of the fitting.

It may be that the tow-bar fitting comprises further second fuse members, and further slots, each further second fuse member being received in a slot as described above.

It may be that the tow-bar attachment comprises a base via which the rest of the tow-bar fitting is mounted to rest of the landing gear assembly and/or the main leg. It may be that one of the base and the tow-bar attachment comprises the or each slot and the or each second fuse member is mounted on the other of the base and the tow-bar attachment.

It may be that the or each slot is an arcuate slot (e.g. a slot that when viewed in plan is curved). It may be that the or each slot extends around a portion of the outer circumference of the first fuse member at a fixed radius from the first fuse member. In the case that there are two second fuse members, it may be that each second fuse member is located at the same radius from the first fuse member, for example on opposite sides of the first fuse member. It may be that each slot is located at the same radius from the first fuse member, for example on opposite sides of the first fuse member. It may be that the two second fuse members and the two slots are arranged symmetrically about the first fuse member. For example, the first fuse member may be located midway between the second fuse members. Such an arrangement may provide a more balanced load distribution across the tow-bar fitting when subject to torque loads, such a reduction in peak stress within the fitting allowing for smaller and/or lighter components to be used and/or increasing the lifetime of the fitting.

The tow-bar fitting may comprise one or more buffers arranged to resist rotation of the tow-bar attachment relative to rest of the landing gear assembly and/or the main leg. A buffer may be arranged to resiliently deform under torque loading. A buffer may comprise a resiliently deformable material, for example rubber. A buffer may comprise a resiliently deformable mechanism, for example a spring.

The tow-bar fitting may comprise a buffer located between the tow-bar attachment and the or each second fuse member, for example in the or each slot. The tow-bar fitting may be arranged such that rotation of the tow-bar attachment causes compression of the buffer and transfer of torque loads to the second fuse member via the buffer.

The tow-bar fitting may comprise a buffer located between the tow-bar attachment and the rest of the landing gear assembly, for example between the tow-bar attachment and the main leg and/or the base. The tow-bar fitting may be arranged such that rotation of the tow-bar attachment causes compression of the buffer.

Use of one or more buffers as described above may further reduce the number of false-failures by damping vibrations transmitted from the tow-bar to the second fuse member and/or accommodate small rotational movements of the tow-bar attachment.

The tow-bar attachment may be comprise one or more attachment features configured to form a mechanical coupling with a tow-bar. The tow-bar attachment may comprise a planar body, the one or more attachment features being formed in and/or connected to the planar body. An attachment feature may comprise a recess, for example a through-hole into which a hook or clamp can be received. For example, the tow-bar attachment may comprise an elongate member, for example a bar mounted to a planar body to form a recess in which a hook or claim may be received. The tow-bar attachment may comprise a recess, for example a through-holed into which the first member is received, for example the first fuse member may extend through a hole in the tow-bar attachment, for example in the planar body, from one side of the tow-bar attachment to the other.

The rest of the landing gear assembly, for example the base (if present) may comprise a channel into which a portion of the tow-bar attachment, for example the planar body, is received. The first fuse member may extend through the tow-bar attachment, for example from one side of the channel to the other. Thus, the first fuse member may be mounted to the rest of the landing gear, for example the base, and extend through the tow-bar attachment such that the tow-bar attachment can pivot about the first fuse member, for example over a range of rotational movement defined by the second fuse member(s).

According to a second aspect of the invention there is also provided an aircraft landing gear assembly comprising a tow-bar fitting for connecting a tow-bar to the landing gear assembly. The tow-bar fitting may comprise: a base via which the tow-bar fitting is mounted to the rest of the aircraft landing gear assembly; and/or a tow-bar attachment to which, in use, a tow-bar is connected. It may be that the tow-bar attachment is rotatably mounted to the base via a first fuse member, the first fuse member being configured to fail at a predetermined linear load threshold. It may be that the tow-bar fitting comprises two second fuse members mounted on one of the tow-bar attachment and the base and being received in slots for movement relative thereto, said slots being formed in the other of the tow-bar attachment and the base; the second fuse members being configured to limit rotational movement of the tow-bar attachment relative to the base and to fail at a predetermined torque load threshold. The aircraft landing gear assembly of the second aspect may have any of the features described above in connection with the first aspect.

In a third aspect of the invention, there is provided, a tow-bar fitting suitable for use as the tow-bar fitting of the first and/or second aspect.

In a fourth aspect of the invention, there is provided an aircraft including a landing gear assembly in accordance with the first and/or second aspect. The landing gear assembly may be a nose landing gear assembly.

The aircraft may be a commercial aircraft, for example a commercial passenger aircraft. The aircraft may comprise a passenger cabin comprising a plurality of rows and columns of seat units for accommodating a multiplicity of passengers. The aircraft may have a capacity of at least 50 passengers, for example at least 100 passengers. The aircraft may be a single aisle or twin aisle aircraft.

In a fifth aspect of the invention, there is provided a method of towing an aircraft having a landing gear having a tow-bar fitting comprising a first fuse member and a second fuse member. The method may comprise attaching the tow-bar to a tow-bar attachment of the tow-bar fitting and towing the aircraft via the tow-bar. It may be that, in the event the linear loads on the tow-bar attachment exceed a predetermined linear load threshold the first fuse member fails. It may be that, in the event the torque loads on the tow-bar attachment exceed a predetermined torque load threshold the second fuse member fails but the first fuse member does not fail (unless the predetermined linear load threshold has also been exceeded). The tow-bar fitting, landing gear and/or aircraft may have any of the features described above in connection with the tow-bar fitting, landing gear assembly and/or aircraft.

The method may comprise, during towing, the tow-bar attachment rotating relative to the rest of the landing gear, for example about the first fuse member, as a result of torque loads exerted on the landing gear by the tow-bar and thereby causing the second fuse member(s) to move along their respective slots. The method may comprise the movement of the or each second fuse member(s) relative to the respective slot causing compression of a buffer 22, such that torque loads are transmitted to the second fuse member from the tow-bar attachment via the buffer. It may be that in the event the first fuse member fails under a linear load then the second fuse member(s) subsequently fail under that linear load.

In a sixth aspect of the invention, there is provided, a method of maintaining an aircraft. The method may comprise replacing the first fuse member of a tow-bar fitting, for example of a tow-bar fitting in accordance with the first or second aspect, in the case the predetermined linear load threshold was exceeded during the method of fifth aspect and/or replacing the second load member for example of a tow-bar fitting in accordance with the first or second aspect in the case the predetermined torque load threshold was exceeded during the method of the fifth aspect. The step of replacing a fuse member may comprise removing any remaining portion of the fuse member remaining in the tow-bar fitting and installing another first fuse member.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
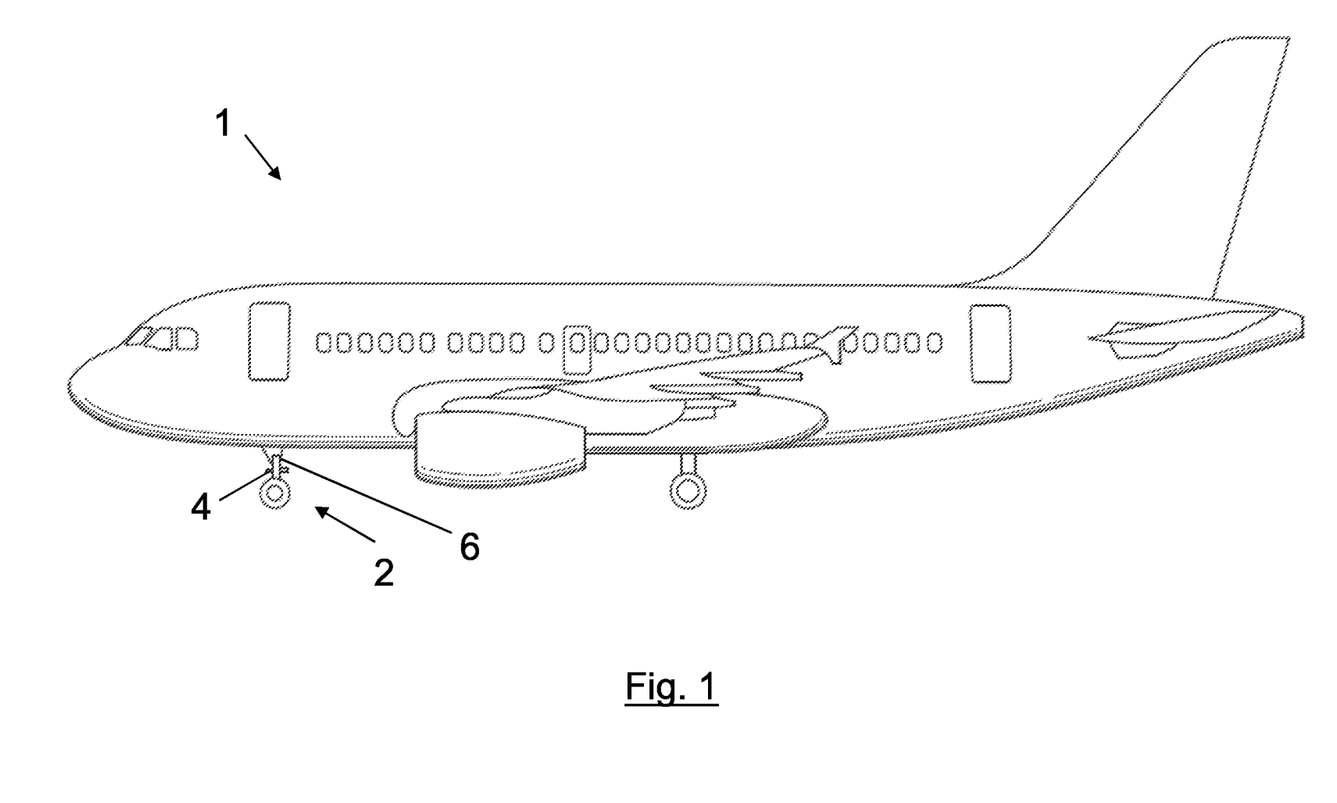
FIG. 1 shows a side view of an aircraft including a tow-bar fitting according to a first embodiment of the invention.
Figure 2:
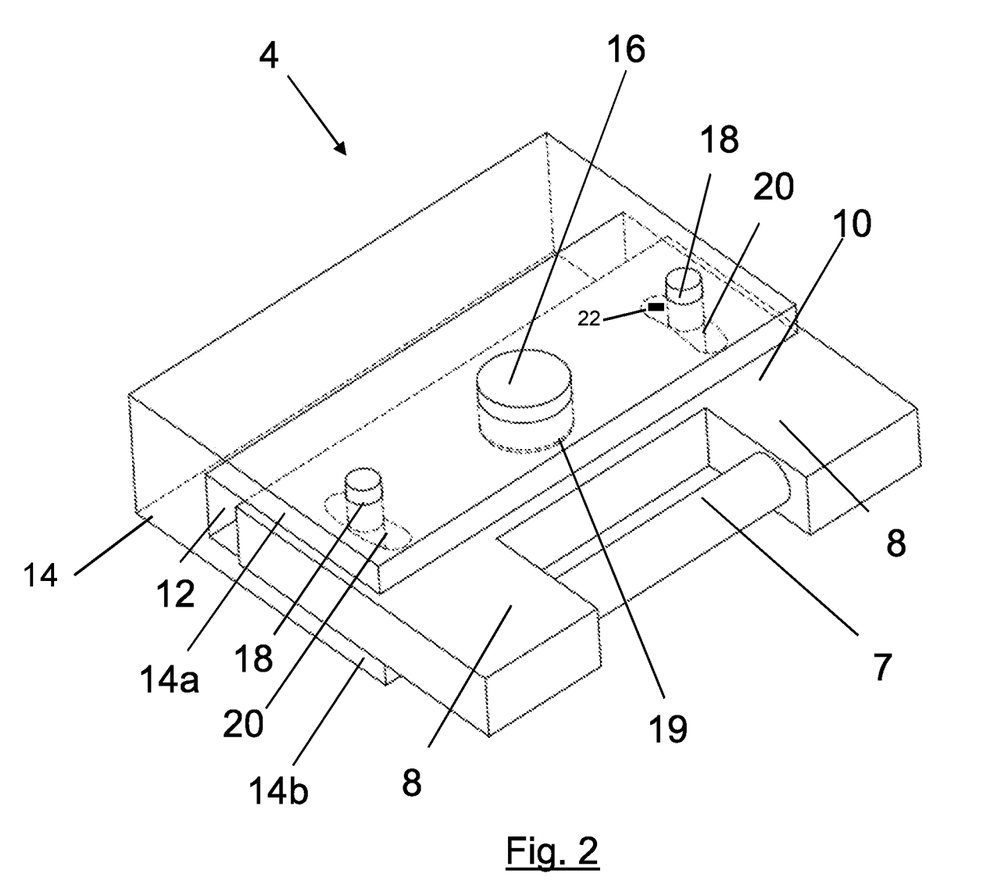
FIG. 2 shows a close up of the tow-bar fitting of FIG. 1.

FIG. 1 shows an aircraft 1 including a nose landing gear 2 in accordance with a first example embodiment of the invention. A tow-bar fitting 4, shown in close up in FIG. 2 is mounted on the main leg 6 of the landing gear 2. With the exception of the tow-bar fitting 4 the construction of the landing gear 2 is entirely conventional.

Figure 4:
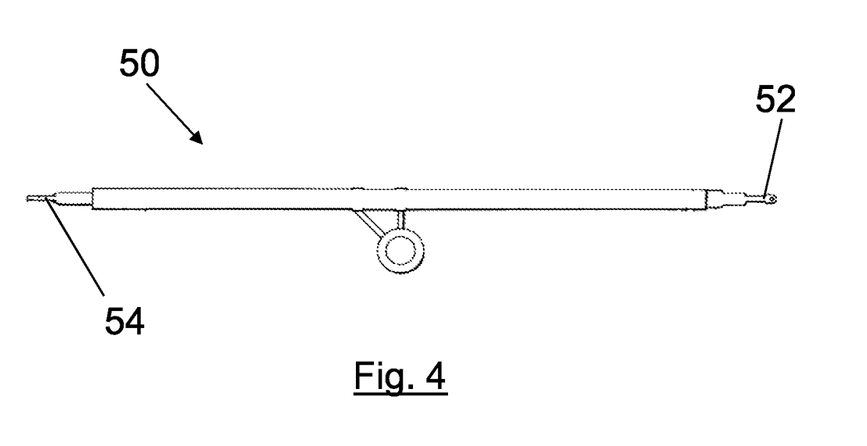
FIG. 4 shows an example tow-bar for use with the tow-bar fitting of FIG. 1.

FIG. 2 shows a close up view of the tow-bar fitting 4 of FIG. 1. The tow-bar fitting 4 comprises a bar 7 to which the hook 52 located at one end of a conventional tow-bar 50 (shown in FIG. 4) can be attached, the other end 54 of the tow bar 50 being attached to a tractor (not shown). The bar 7 is mounted between two arms 8 extending from a plate 10. The plate 10 is partially received in a channel 12 formed between an upper portion 14a and a lower portion 14b of a base 14 which is mounted on the main leg 6 (not shown in FIG. 2) of the landing gear 2. A central fuse pin 16 extends between the upper portion 14a and lower portion 14b and passes through a hole 19 in the plate 10. The hole 19 and therefore the central fuse pin 16 is located on a centreline of the plate 16, the centreline extending perpendicular to the longitudinal axis of the bar 7 and in the plane of the plate 10. A pair of arcuate slots 20 are located one on either side of the central fuse pin 16, each slot 20 extending along a fixed radius from the central fuse pin 16. A secondary fuse pin 18 extends through each slot 20 from the upper portion 14a and the lower portion 14b of the base 14. In the present embodiment, buffers in the form of blocks of rubber (not shown) are located in each slot 20 on either side of the secondary fuse pin 18.

In use, the hook 52 of the tow-bar 50 is attached to the bar 7 in order to tow the aircraft 1. In normal use, linear loads (i.e. push-pull loads) are transmitted to the base via the central fuse pin 16. Torque loads are not transmitted to the base via the central fuse pin 16, instead torque loads on the bar 7 cause the plate 10 to rotate about the central pin 16. Torque loads are then transmitted to the base via the secondary fuse pins 18 as a result of contact between the blocks of rubber located in the slots 20 and the secondary fuse pins 18. If the torque loads exceed a predetermined threshold the secondary fuse pins 18 fail thereby protecting the landing gear from the excess torque loads. If the linear loads exceed a predetermined threshold the central fuse pin 16 fails thereby protecting the landing gear from the excess linear loads. The threshold at which the central fuse pin 16 fails differs from the threshold at which the secondary fuse pins 18 fail. Thus, towing assemblies in accordance with the present example can provide different limits for linear and torque loads thereby reducing the risk of damage to the landing gear and/or reducing the frequency at which the fuse pins must be replaced.

Typically, the central fuse pin 16 is sized to fail at a higher load than the secondary fuse pins 18 because the landing gear is design to withstand higher linear loads than torque loads. Thus, if the central fuse pin 16 fails the secondary fuse pins will subsequently fail.

The presence of the rubber buffers in the slots 20 prevents excessive rotation of the plate 10 and damps the transmission of load from the plate 10 to the secondary fuse pins 18 so that small rotations and/or vibrations do not cause unnecessary failure of the secondary fuse pins 18. The presence of the rubber in the slots 20 may also assist in stabilising the plate. It will be appreciated that other deformable materials can be used as a buffer instead of or as well as rubber. Alternatively, the buffer may be a mechanical buffer comprising a shock-absorbing mechanism, for example a spring. In yet further embodiments a buffer may be located in the channel 12 between the base 14 and plate 10 instead of or as well as in the slots 20.

Figure 3:
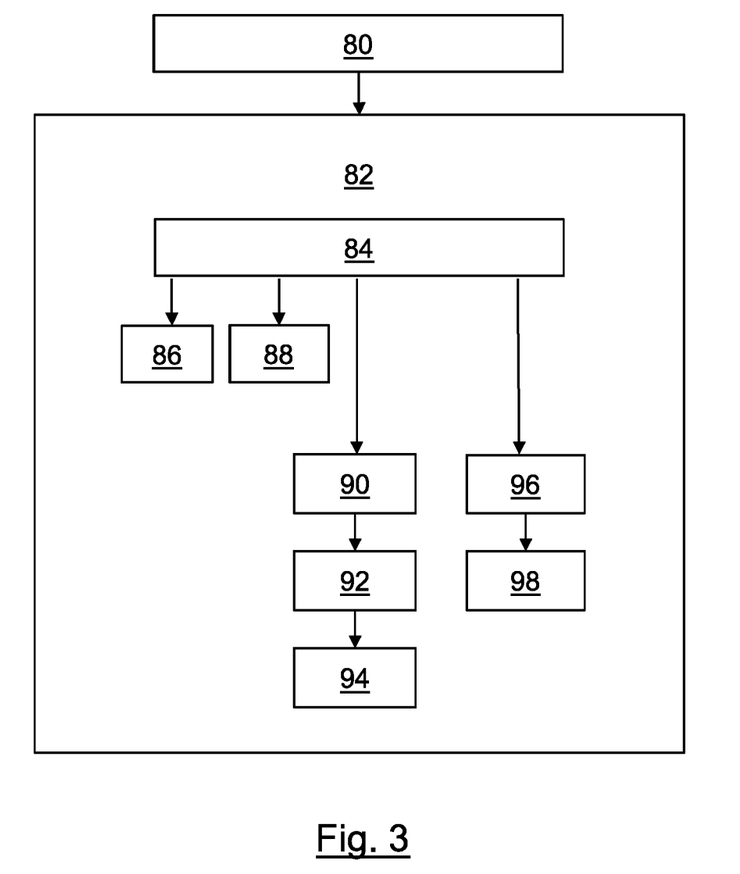
FIG. 3 is a flow diagram illustrating a method of towing an aircraft according to an embodiment of the invention.

FIG. 3 shows an example method of towing an aircraft using a tow-bar fitting in accordance with the present invention, for example the tow-bar fitting 4 of FIG. 2. To begin, one end of a tow-bar is coupled 80 to the tow-bar fitting, for example to the bar 7. The aircraft is then towed 82 using a tractor. During towing 82, linear loads and torque loads are transmitted 84 from the tow-bar to the landing gear via the tow-bar fitting. Vibrations and small variations in torque loads from the tow-bar are accommodated by sliding 86 of the secondary fuse pins in the slots and/or compression 88 of the rubber bumpers.

In the event that the linear loads exceed the predetermined linear threshold 90, the central fuse pin fails 92 thereby protecting the landing gear. The secondary fuse pins will also subsequently fail 94 if the central fuse pin is sized to withstand larger loads than the secondary fuse pins. In the event that the torque loads exceed the predetermined torque threshold 96, the secondary fuse pins fail 98 thereby protecting the landing gear. If the central fuse pin and/or secondary fuse pins have failed they must be replaced with new fuse pins before the aircraft can return to service.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the above example, the base 14 is shown as a separate component from the main leg 6 but it will be appreciated that the base could be integrally formed with the main leg. It will also be appreciated that the geometry of the base 14 and plate 10 can vary from that shown in FIG. 1. In some embodiments, the bumper(s) may be absent.

In the above example, two secondary fuse pins are provided, it will be appreciated that a single secondary fuse pin may be used or more than two secondary fuse pins may be used. Similarly, the secondary fuse pin(s) may be located at different positions with respect to the central pin in the radial and/or circumferential sense.

In the above example, a single central fuse pin is described. It will be appreciated that more than one fuse pin may be used to protect against excess linear loads.

In the above example, a bar is used to couple the tow-bar to the tow-bar fittings. It will be appreciated that different forms of attachment feature can be used. For example an eye or hook could be used to couple the tow-bar to the tow-bar fitting.

In the above examples fuse pins are used, but it will be appreciated that the fuse member may take other forms, for example a fuse bolt.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft landing gear assembly comprising a tow-bar fitting for connecting a tow-bar to the landing gear assembly, the tow-bar fitting comprising:
   a tow-bar attachment to which, in use, the tow-bar is coupled;
   a first fuse member via which linear loads but not torque loads are transmitted from the tow-bar attachment to the rest of the landing gear assembly, the first fuse member being configured to fail at a predetermined linear load threshold;
   a second fuse member via which torque loads are transmitted from the tow-bar attachment to the rest of the landing gear assembly, the second fuse member being configured to fail at a predetermined torque load threshold;
   wherein the tow-bar fitting comprises a slot and the second fuse member is received in the slot such that the second fuse member moves along the slot when the tow-bar attachment rotates relative to a main leg of the landing gear assembly and the range of movement of the second fuse member along the slot determines the range of rotational movement of the tow-bar attachment relative to the main leg; and,
   wherein the or each slot is an arcuate slot.

2. An aircraft landing gear assembly according to claim 1, wherein the tow-bar attachment is mounted to the rest of the landing gear assembly via the first fuse member for rotation relative to the rest of the landing gear assembly, and the second fuse member is arranged to limit rotation of the tow-bar attachment relative to the rest of the landing gear assembly.

3. An aircraft landing gear assembly according to claim 1, wherein the tow-bar fitting comprises two second fuse members and two slots, and each second fuse member is received in a slot such that the second fuse member moves along the slot when the tow-bar attachment rotates relative to the rest of the landing gear assembly and the range of movement of the second fuse member along its slot determines the range of rotational movement of the tow-bar attachment relative to the rest of the landing gear assembly.

4. An aircraft landing gear assembly according to claim 3, wherein the two second fuse members are arranged on opposite sides of the first fuse member.

5. An aircraft landing gear assembly according to claim 3, wherein the two second fuse members are arranged symmetrically about the first fuse member.

6. An aircraft landing gear assembly according to claim 1, wherein the tow-bar attachment comprises a base via which the rest of the tow-bar fitting is mounted to a main leg of the landing gear assembly, and wherein one of the base and the tow-bar attachment comprises the or each slot and the or each second fuse member is mounted on the other of the base and the tow-bar attachment.

7. An aircraft landing gear assembly according to claim 1, wherein the tow-bar fitting comprises a buffer arranged to resist rotation of the tow-bar attachment relative to rest of the landing gear assembly.

8. An aircraft landing gear assembly according to claim 7, wherein the buffer comprises a resiliently deformable material.

9. An aircraft landing gear assembly according to claim 8, wherein the resiliently deformable material is rubber.

10. An aircraft landing gear assembly according to claim 7, wherein a buffer is located between the tow-bar attachment and the or each second fuse member such that rotation of the tow-bar attachment causes compression of the buffer and transfer of torque loads to the second fuse member via the buffer.

11. An aircraft landing gear assembly according to claim 7, wherein the buffer is located between the tow-bar attachment and the rest of the landing gear assembly such that rotation of the tow-bar attachment causes compression of the buffer.

12. A tow-bar fitting suitable for use as the tow-bar fitting of claim 1.

13. An aircraft including a landing gear assembly in accordance with claim 1.

14. A method of maintaining an aircraft, the method comprising replacing the first fuse member of a tow-bar fitting in accordance with claim 1 in the case the predetermined linear load threshold was exceeded a predetermined linear load threshold during towing.

15. A method of maintaining an aircraft, the method comprising replacing the second fuse member of a tow-bar fitting in accordance with claim 1 in the case the predetermined torque load threshold was exceeded a predetermined torque load threshold during towing.

16. An aircraft landing gear assembly comprising a tow-bar fitting for connecting a tow-bar to the landing gear assembly, the tow-bar fitting comprising:
   a base via which the tow-bar fitting is mounted to the rest of the aircraft landing gear assembly; and
   a tow-bar attachment to which, in use, a tow-bar is connected, the tow-bar attachment being rotatably mounted to the base via a first fuse member, the first fuse member being configured to fail at a predetermined linear load threshold; and
   two second fuse members mounted on one of the tow-bar attachment and the base and being received in slots for movement relative thereto, said slots being formed in the other of the tow-bar attachment and the base; the second fuse members being configured to limit rotational movement of the tow-bar attachment relative to the base and to fail at a predetermined torque load threshold; and,
   wherein the slots are arcuate slots.

* * * * *